US005265210A

United States Patent [19]

Vatti et al.

[11] Patent Number: 5,265,210

[45] Date of Patent: Nov. 23, 1993

[54] METHOD AND APPARATUS FOR PLOTTING PIXELS TO APPROXIMATE A STRAIGHT LINE ON A COMPUTER DISPLAY DEVICE WITHOUT SUBSTANTIAL IRREGULARITIES

[75] Inventors: Bala R. Vatti, Hudson; Robert L. Hammond, Nashua, both of N.H.

[73] Assignee: CalComp Inc., Anaheim, Calif.

[21] Appl. No.: 787,100

[22] Filed: Nov. 4, 1991

[51] Int. Cl.[5] .............................................. G06F 15/62

[52] U.S. Cl. ................................... 395/143; 395/132; 395/164

[58] Field of Search ............................... 395/128-132, 395/133, 138-139, 141-143, 164-166

[56] References Cited

U.S. PATENT DOCUMENTS 4,808,988 2/1989 Burke et al. .................... 395/143 X
5,067,098 11/1991 Moellering et al. ............ 395/131 X

OTHER PUBLICATIONS

Fundamentals of Interactive Computer Graphics, Jan. 1982.

Computer Graphics, A Programming Approach 1987.

*Primary Examiner*—Gary V. Harkcom
*Assistant Examiner*—Almis Jankus
*Attorney, Agent, or Firm*—Robert G. Crooks

[57] ABSTRACT

This method and apparatus are suitable for inclusion in the "graphics circuit board" of a personal computer. The digital output of the computer is used to plot a series of "pixel pairs" which, taken together, closely approximate the desired path of a line to be drawn on a display device such as a color cathode-ray tube. The addresses and relative intensities of the pixels of each pair and of the series are computed so as to produce a line that is substantially free from the "jaggies" resulting from "aliasing" in prior-art apparatus. Computation of addresses relies upon both integer and floating-point numbers.

4 Claims, 9 Drawing Sheets

Algorithm:

```
For i = 0 to N do;
   SIcoordinate = FIX(SFcoordinate);
   intensity = SIcoordinate AND 15;
   color1 = color OR intensity;
   Icoordinate = SHR(SIcoordinate, 4);
   Draw_pixel(Icoordinate, color1);
   color2 = color1 XOR 15;
   Draw_pixel(Icoordinate=1, color2);
   SFcoordinate = SFcoordinate + DelSFcoordinate;
   End;
```

Wherein:

SIcoordinate = Scaled-integer coordinate of the pixel to be plotted and rendered;
SFcoordinate = SIcoordinate in floating-point format;
DelSFcoordinate is floating-point scaled delta value needed to compute the address of the next pixel;
Draw_pixel draws a pixel at the specified coordinate using the specified color;
FIX converts a floating-point value to integer format, truncating the fraction;
AND is bitwise Boolean AND operation;
OR is bitwise Boolean OR operation;
XOR is bitwise exclusive OR operation; and
SHR shifts bits right in a given word by a given number.
Shifting bits by four places has the effect of division by 16.
Scale factor used in this implementation is 16 to get 4 bits of intensity.

*FIG. 2*

For Absolute Magnitude of Slope < 1 :

| | | |
|---|---|---|
| SX (Integer) | SY (Integer) | SY (Fraction) |
| | + | |
| DelSX (Integer) | DelSY (Integer) | DelSY (Fraction) |

(All Floating-Point Numbers)

The Sum of Above Values Is Address of Next Pixel

*FIG. 3*

Wherein, for Both Fig. 3 and Fig. 4:
SX is scaled X coordinate;
SY is scaled Y coordinate;
DelSX is delta scaled X coordinate; and
DelSY is delta scaled Y coordinate.

For Absolute Magnitude of Slope ≥ 1 :

| | | |
|---|---|---|
| SY (Integer) | SX (Integer) | SX (Fraction) |
| | + | |
| DelSY (Integer) | DelSX (Integer) | DelSX (Fraction) |

(All Floating-Point Numbers)

The Sum of Above Values Is Address of Next Pixel

*FIG. 4*

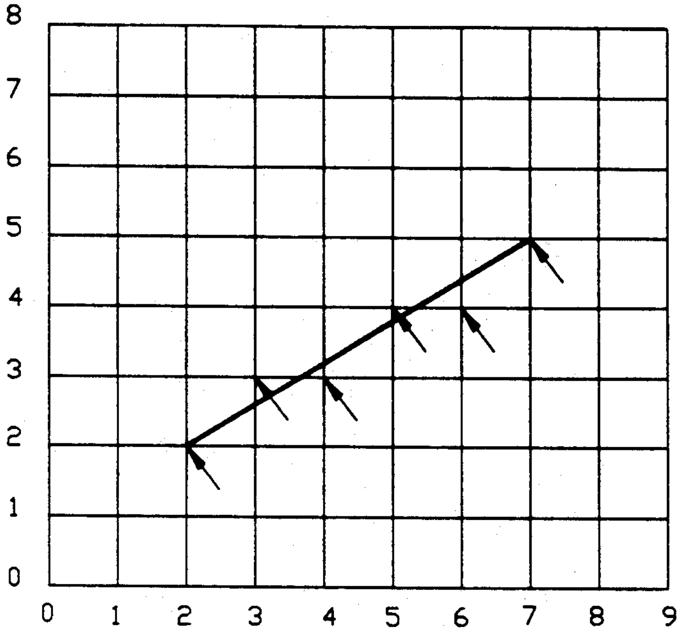

FIG. 5

The above line is drawn from (2,2) to (7,5) in accordance with the prior art. Arrowheads indicate the pixels that are lit.

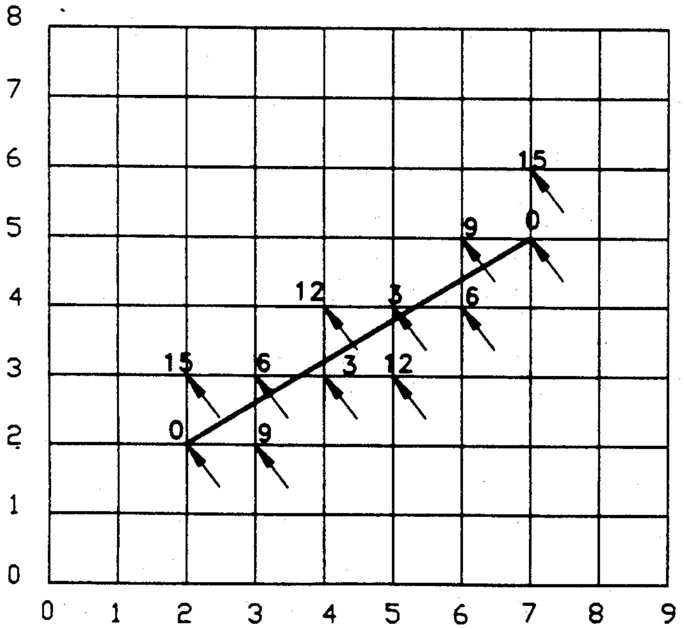

FIG. 6

The line is drawn from (2,2) to (7,5) in accordance with the invention. Intersections of the grid lines show the centers of pixels. The pixels that are lit for the antialiased line are indicated by the arrowheads. The numbers show the intensities on a scale 0 to 15. The smaller the number, the greater is the actual intensity.

Complementary Pixel Computation
For Absolute Magnitude of Slope < 1
(All Integer Format in Microprocessor 11)

Principal Pixel Computation
For Absolute Magnitude of Slope ≥ 1
(All integer format in Microprocessor 11)

METHOD AND APPARATUS FOR PLOTTING PIXELS TO APPROXIMATE A STRAIGHT LINE ON A COMPUTER DISPLAY DEVICE WITHOUT SUBSTANTIAL IRREGULARITIES

This invention relates to a method and apparatus for preventing "aliasing" in the drawing of lines in the displays of computers that have graphic outputs. The invention is directed to the elimination of the "jaggies" which occur in some lines drawn on conventional display devices in computer graphics. The "jaggies" are especially troublesome in lines that are nearly horizontal or nearly vertical on the screen of the device. In those particular lines, the steps that comprise the "jaggies" are most apparent and most annoying to the viewer of the display.

BACKGROUND OF THE INVENTION

In the fields of computer-aided design ("CAD"), computer-aided engineering ("CAE"), and computer-aided manufacturing ("CAM"), an essential technological element is "interactive computer graphics." By using this technology, the viewer of the graphic display can modify the displayed image and observe the immediate and consequential effects of such modification of the object or document displayed. In order for the aforementioned technology to be of maximum value, the image shown on the display device should be portrayed in full color.

As is well known, the most commonly-used display device is the color cathode-ray tube. Of course, the color cathode-ray tube is an *analog* device in which the position and intensity of each illuminated spot formed on the face of the tube by its electron beams are continuous functions of the respective voltages applied to the deflecting plates and the electron guns of the tube. Most commonly, there is one electron gun for each of three primary colors: red, green, and blue. Thus, the location of each illuminated spot on the screen is determined by the voltages on the deflecting plates, whereas the color and intensity of each illuminated spot are determined by the absolute and relative magnitudes of the voltages applied to the electron guns. The absolute magnitude of each voltage determines the intensity of illumination of the spot, whereas the relative magnitudes of the voltages on the respective electron guns determine the spectral hue of each spot.

So long as the electronic circuitry that supplies the aforementioned voltages to the deflecting plates and electron guns of the color cathode-ray tube is capable of smooth variations in output magnitude, the lines drawn on the display can likewise be smooth and free from "jaggies." Furthermore, when the control circuitry for the cathode-ray tube is strictly *analog* in nature, there is no limitation on the freedom of choice concerning the respective paths to be followed by lines drawn on the face of the display. When a cathode-ray tube is used in *random-scan* fashion, controlled by analog circuitry, a line can be drawn on the face of the tube directly from any "addressable" point to any other addressable point on the face of the tube.

By contrast, when a color cathode-ray tube is used as the output or display device of a *computer-graphics* apparatus, it is generally no longer possible to connect directly any two arbitrarily-chosen points on the face of the tube by a straight line having no irregularities. Thus, the display device used in computer graphics must be regarded as having a matrix of discrete picture elements, or "pixels," each of which can be activated or made bright when it is energized by an electron beam of the cathode-ray tube. Except in certain limited circumstances, it is not possible to draw a perfectly straight line from one arbitrary addressable point on the face of the tube to another arbitrary addressable point on the face of the tube. In conventional computer graphics, the best that can be achieved is an *approximation* of a straight line by activating a series of pixels as close as possible to the desired path of the line on the face of the tube. Only in the special cases of lines which are *horizontal* or *vertical*, or which have a slope with an absolute magnitude of *unity*, will the activated pixels form the desired perfectly straight line. In all other cases, the desired straight line will be only approximated by the pixels which are illuminated as closely as possible to the desired path of the line. The departure of the displayed line from the desired straight line is called "error," which includes the effects of "aliasing" characterized by a series of "stair steps," impairing the best possible approximation of a smoothly-sloping line on the face of the cathode-ray tube. Those "stair steps" become especially apparent, and consequently most offensive, in lines which are very close to the vertical or very close to the horizontal directions on the tube face. The "stair steps" disappear when the line has a slope of unity or when it is absolutely horizontal or vertical in its direction of orientation.

In computer graphics, the electronic circuitry that assembles the data for determining the location, intensity, and color of each illuminated spot on the face of the cathode-ray tube is *digital*, rather than analog, in nature. Only in the very last stage prior to inputting the voltages to the control electrodes of the cathode-ray tube are those voltages converted from digital to analog form. In most computer display apparatus, an electronic representation of each and every pixel of the display is "mapped" in a large piece of contiguous memory hardware called a "frame-buffer pixel memory." For each pixel desired to be displayed on the face of the cathode-ray tube, there must be in the frame-buffer pixel memory an address at which sufficient data are stored to specify the color intensity and hue of that pixel in the display. Assuming that the "rasterized image" desired to be displayed covers the entire face of the cathode-ray tube, there must be in the frame-buffer pixel memory a data entry for each pixel on the face of the tube. The sum total of this memory is called a "bit plane." If the display device were a black-and-white, or monochrome, cathode-ray tube, the entry of a single bit of intensity data at each address in the frame-buffer pixel memory would suffice. However, since it is our assumption that we are interested primarily in a display apparatus having *multi-color* capabilities, a *plurality* of bit planes is required. Thus, in the type of apparatus with which this invention is concerned, the frame-buffer pixel memory assembles data constituting a *plurality* of bit planes. One bit of data can be stored in *each* such bit plane at a time.

Each of the pixels to be displayed on the face of the cathode-ray tube must have an address at which its color intensity and hue are stored in the frame-buffer pixel memory. Each such address is commonly stated in terms of the X and Y Cartesian coordinates of the pixel to be activated on the face of the cathode-tray tube. Assuming that a straight line is desired to be plotted for display on the screen, the computation of the successive X and Y coordinates of the respective pixels approximating such a straight line has often been carried out by incrementing or decrementing either the X or Y coordinate of a pixel address by one unit and by determining a "delta value" by which the *other* coordinate must be adjusted to correspond to the unit incrementation or decrementation of the first-mentioned coordinate in going from the address of one pixel to the address of the next pixel to be plotted and displayed. If the absolute magnitude of the slope of the line to be drawn is *less* than unity, such a prior-art line-drawing apparatus would increment the X coordinate by one unit and then compute the delta value for the Y coordinate, which would be an amount *less* than unity. On the other hand, if the absolute magnitude of the slope of the line to be drawn is *greater* than unity, the apparatus would increment the Y coordinate by one unit and then compute the delta value for the X coordinate which, again, would be an amount *less* than unity. If the slope of the line to be drawn is *negative*, or if it is being plotted from *right to left*, incrementation is replaced by *decrementation*. In order to avoid cumbersome repetition, the word "increment" will be used in the remainder of this specification to include *both* "increment" and "decrement."

According to a commonly-used prior-art algorithm developed for this purpose by J.E. Bresenham and published in an article entitled, "Algorithm for Computer Control of a Digital Plotter," appearing in the *IBM System Journal*, Vol. 4, pp. 25–30 in 1965, the "error" had to be evaluated during each iteration of the operative "loop" of the algorithm. The error to be evaluated was the "departure" or distance of each plotted pixel from the line desired to be plotted. This "condition testing" and "branching" in each loop of the algorithm were very expensive in terms of processing time. Moreover, the inability of prior-art microprocessors to handle numbers in other than "integer format" made infeasible the processing or computation of pixel addresses in *non-integer* format that might have permitted significant time savings to be made. Furthermore, the prior art has been deficient in that no satisfactory means was provided for the elimination of the offensive "jaggies" appearing in most lines of displays using prior-art apparatus and prior-art processing methods.

OBJECTS OF THE INVENTION

The existence of "jaggies" in the display of lines drawn on computer-graphics apparatus of the prior art severely limits the availab those displays. Methods and apparatus of the prior art simply do not permit the display of smooth, straight or curved lines, free from offensive "stair steps." Accordingly, it is a primary object of this invention to provide a method and apparatus for plotting and displaying lines generated by computer circuitry but substantially free from degradation by aliasing attributable to the necessary computation and storage of pixel data as discrete elements in a plurality of bit planes.

It is another object of this invention to take advantage of recent developments in the field of microprocessors that are now able to make computations involving numbers expressed in forms other than the integer format.

It is a further object of this invention to redistribute the "responsibility" for computations as between the microprocessor, on the one hand, and other pixel-data-control-and-management apparatus, on the other hand. The microprocessor becomes enabled to respond to a longer algorithm which, however, does not require "branching" within the iterative loop of the processing operation.

It is a still further object of this invention substantially to eliminate aliasing from line images in the display, while concurrently reducing processing time per iteration. In that way, processing speed would be substantially increased, concurrently with an increase in detail and resolution of the display.

SUMMARY OF THE INVENTION

Briefly, we have fulfilled the above-mentioned and other objects of our invention by providing a method and apparatus in which an anti-aliasing algorithm causes a principal pixel and a complementary pixel to be plotted for each point on each line that is to be displayed. The center of the principal pixel is on one side of the desired path of the line to be plotted, whereas the center of the complementary pixel is on the *other* side of the desired path of the line. The algorithm allocates the intensities between the principal pixel and the complementary pixel to give the psychological impression that each point plotted for inclusion in the line display is actually located *between* the two pixels at a location *on the desired path of the line.*

Besides allocating the relative intensities between the principal pixel and the complementary pixel at each point on the line to be plotted, the algorithm also specifies the *mode* of computation of the X and Y coordinates of the principal and complementary pixels as they are plotted in successive pairs in the development of the line. The X and Y coordinates for each principal and each complementary pixel are computed by the microprocessor in *floating-point* format. The use of floating-point computation permits more address information to be crowded into limited memory space and eliminates time-consuming "branching within the loop." Significant time is saved by eliminating condition testing and branching within the loop, which were formerly required by the Bresenham algorithm.

Although the respective X and Y coordinates of the principal and complementary pixels of each pair are computed in floating-point format, the respective *intensities* of the principal and complementary pixels of each pair are computed in *integer* format. The computation of respective intensities of the principal and complementary pixels is accomplished on a scaled basis ranging from zero intensity to the highest possible intensity permitted to a pixel. The number of units comprising the scale should be a fixed power of two, such as 16. This highest possible intensity level is allocated between the principal and complementary pixels. Thus, the sum of the intensity levels of the two pixels of each pair is always equal to the aforementioned fixed power of two. Accordingly, despite the variable allocation of intensities between the principal and complementary pixels of each pair, the *total* apparent brightness as pixel pairs are plotted and the line is gradually developed is *constant.* Therefore, the psychological effect upon the viewer is that the brightness of the line does not change appreciably as it is plotted and displayed from its initial point to its terminus.

We have observed that the practice of this invention requires employment of a *plurality* of bit planes if the color capabilities of the invention are to be realized. The frame-buffer pixel memory must have the capacity to assemble data constituting the plurality of bit planes. The number of bit planes is the exponent in a "power of two" which determines the number of levels in the scale of intensities described in the foregoing paragraph. For instance, if the number of bit planes is *four*, the number of levels in the scale of intensities is $2^4$, or 16.

The number of bit planes is determined by, among other things, the hardware of the frame-buffer pixel memory. The data assembled in the frame-buffer pixel memory can be allocated at will between the intensity and the hue of the pixels. Thus, there is a trade-off between the numbers of possible gradations of intensity and hue respectively. For the purposes of illustration and explanation, the following detailed specification will be based on the assumption that there are eight bit planes, and that the available eight bits of data have been allocated four bits to intensity and four bits to hue. This is the allocation which we happen to regard as optimum in the present state of the computer-display art. However, our invention is not limited or circumscribed by our present view of the "optimum" allocation of data bits between intensity and hue.

A key step in the performance of the method and apparatus in accordance with our invention is the conversion of newly-computed address information from floating-point format to scaled-integer format in which a fractional component of the representation of one of the X or Y coordinates can be separated from the remainder of the address in scaled-integer format to indicate the *intensity* of the pixel on a scale of 16.

Execution of the steps required by our algorithm is relatively simple because the complementary pixel of each pair is always displaced by precisely one scale unit from the principal pixel, measured along a "minor axis." As between the X and Y coordinates, the "minor axis" always lies in the direction which is changing less rapidly of the two. That is to say, if the magnitude of the slope of the line being plotted is less than unity, the minor axis is the Y axis, and the complementary pixel will be displaced by one scale unit from the principal pixel, measured in the Y direction. On the other hand, if the magnitude of the slope of the line is equal to or *greater* than unity, the complementary pixel will be displaced by one scale unit from the principal pixel of the pair, measured in the X direction, because the X coordinate is increasing less rapidly than the Y coordinate.

The implementation of our invention as set forth in this specification is based upon the assumption that each line being plotted is a straight line of constant hue. Thus, during the plotting of each line, the pixel data supplied by the frame-buffer pixel memory for each pixel memory address can be limited to four bits of hue data and four bits of intensity data for each pixel. These data are fed to a "look-up table" for each of the primary colors: red, green, and blue. In concept, the color-lookup table acts as a matrix which supplies red, green, and blue intensity signals to the respective electron guns of the cathode-ray tube for each possible combination of hue and intensity inputted to the look-up table. During such time as the hue input to the look-up table remains constant, the color-lookup table conceptually produces red, green, and blue signals that do not vary relatively among themselves but are constrained by a *maximum total value* imposed by the *intensity* input index to the look-up table.

In physical *actuality*, the four bits of hue data and the four bits of intensity data go to each of *three* look-up tables, one for each of the primary colors, each feeding a digital-to-analog converter connected to respective ones of the electron guns of the cathode-ray tube. Thus, the data from eight bit planes stored in the frame-buffer pixel memory take the form of eight bits of color and intensity data that go to *each* of the three color-lookup tables and thence to the respective digital-to-analog converters for each of them. The converters produce respective analog intensity signals that control the respective electron guns of the color-cathode-ray tube.

A suitable microprocessor capable of handling data in both integer and floating-point formats is the Model TMS 32OC30 microprocessor marketed by Texas Instruments Inc. of Dallas, Tex., or its equivalent. However, the practice of our invention is not limited to the employment of that particular microprocessor. Suitability of the microprocessor is determined primarily by its capacity and speed. In summary, this invention permits the speed of processing and the resolution of the display to be increased, while simultaneously substantially eliminating distortion attributable to the effects of aliasing.

BRIEF DESCRIPTION OF THE DRAWINGS

The invention summarized above will be described in detail in the following specification. The specification wi 1 1 be best understood if read while referring to the accompanying drawings, in which:

FIG. 2 is a representation in "program language" of the "line-rendering loop" which is stored in program memory and which controls the microprocessor in the line-drawing apparatus according to this invention. Definitions of each element of the program language are given below the language of the line-rendering loop;

FIG. 3 is a schematic representation of the addition by the microprocessor of floating-point numbers representing the respective coordinates of a just-activated pixel of the line and floating-point numbers representing the corresponding delta functions necessary to augment the coordinates of the just-activated pixel to obtain the coordinates of the *next* pixel to be activated. The schematic representation of FIG. 3 is for the case in which the absolute magnitude of the slope of the line to be drawn is less than unity;

FIG. 4 is a schematic representation of the corresponding addition of floating-point numbers to augment the coordinates of a just-activated pixel by the appropriate delta functions to obtain the coordinates of the next pixel to be activated, this representation being for the case in which the absolute magnitude of the slope of the line to be drawn is *greater* than or equal to unity;

FIG. 5 is a representation of the way in which a line was drawn from the point (2,2) to the point (7,5) in accordance with the *prior-art* method of drawing lines without elimination of the effects of aliasing;

FIG. 6 is a representation of the way in which a line is drawn from (2,2) to (7,5) in accordance with *this invention*, whereby the effects of aliasing are substantially eliminated by plotting principal and complementary pixels, in pairs, for each point on the line to be drawn. Arrowheads represent centers of pixels, and numbers represent relative intensities of principal and complementary pixels on a scale of 0 to 15, 0 being the *highest* relative intensity;

Figure 9:
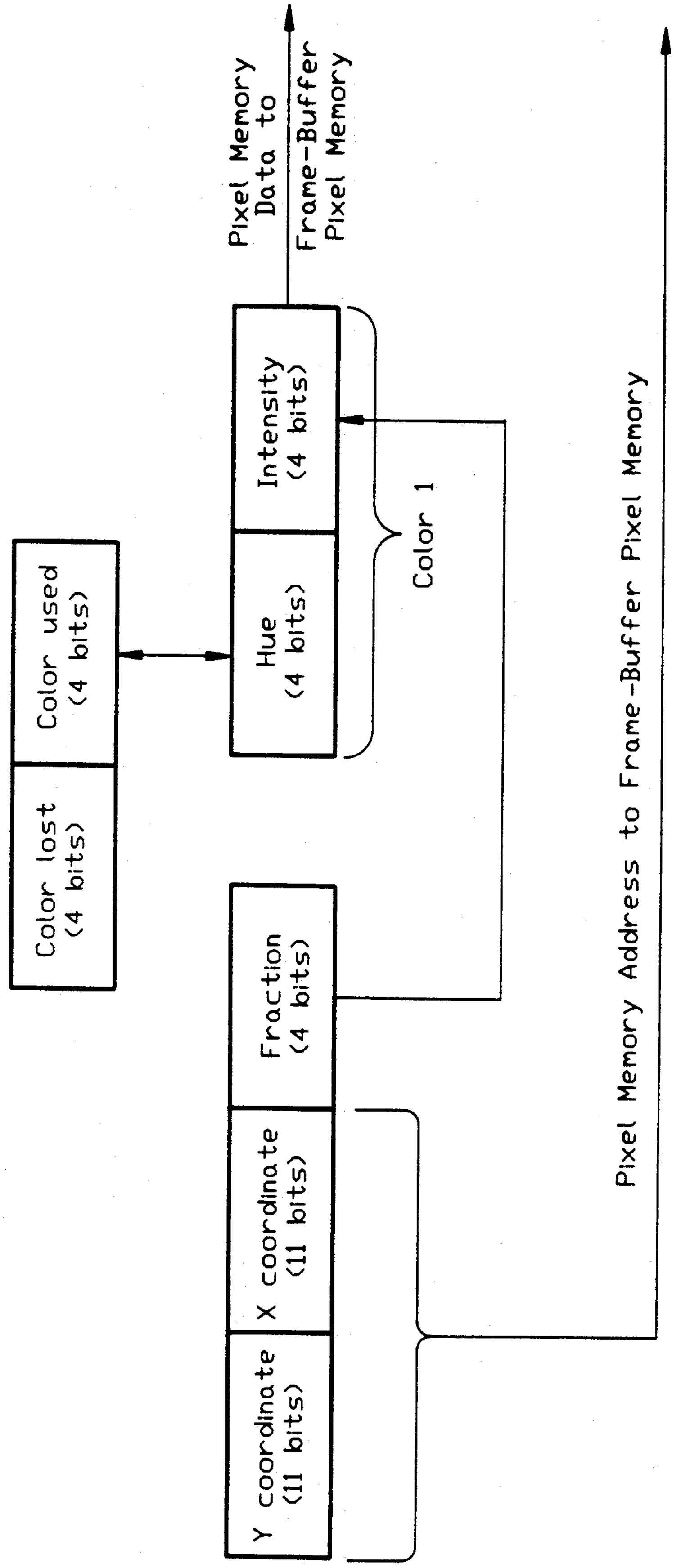
Figure 10:
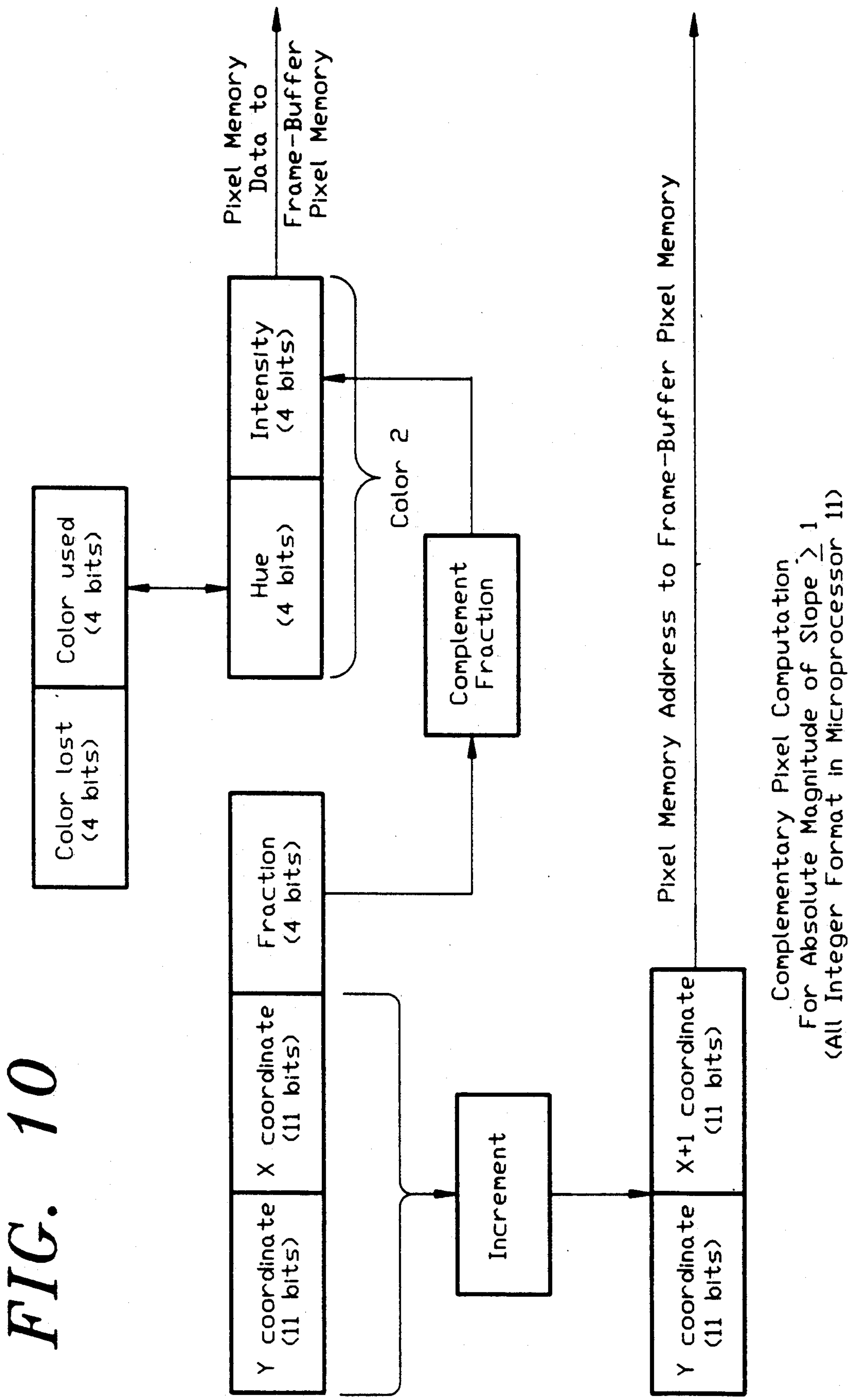
Figure 11:
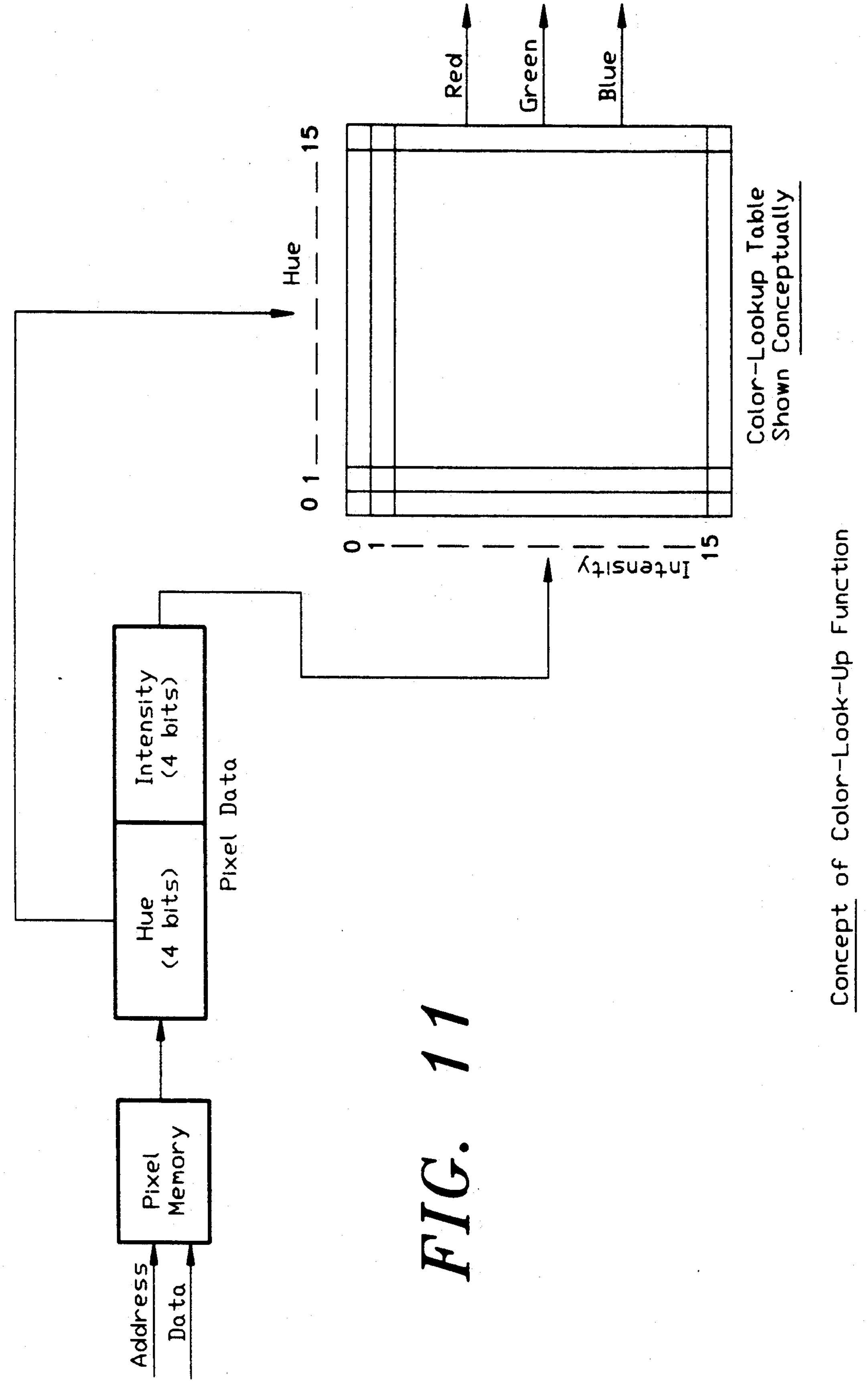

*tary* pixels in a line having an absolute slope less than unity;

FIG. 9 is a schematic representation of the computation of address and color-intensity data for *principal* pixels in a line having an absolute slope greater than or equal to unity;

FIG. 10 is a schematic representation of the computation of address and color-intensity data for *complementary* pixels in a line having an absolute slope greater than or equal to unity; and FIG. 11 is a schematic representation of the *concept* of the color-look-up function for each pixel in such a way as to develop analog signals for control of the respective red, green, and blue electron guns of the color-cathode-ray tube. The representation of FIG. 11 is *only conceptual* in nature. The actual *physical* apparatus according to this invention includes *three* color-look-up tables and *three* digital-to-analog converters as shown at the right-hand side of *FIG. 1* of the drawings.

DESCRIPTION OF THE PREFERRED EMBODIMENT

Figure 1:
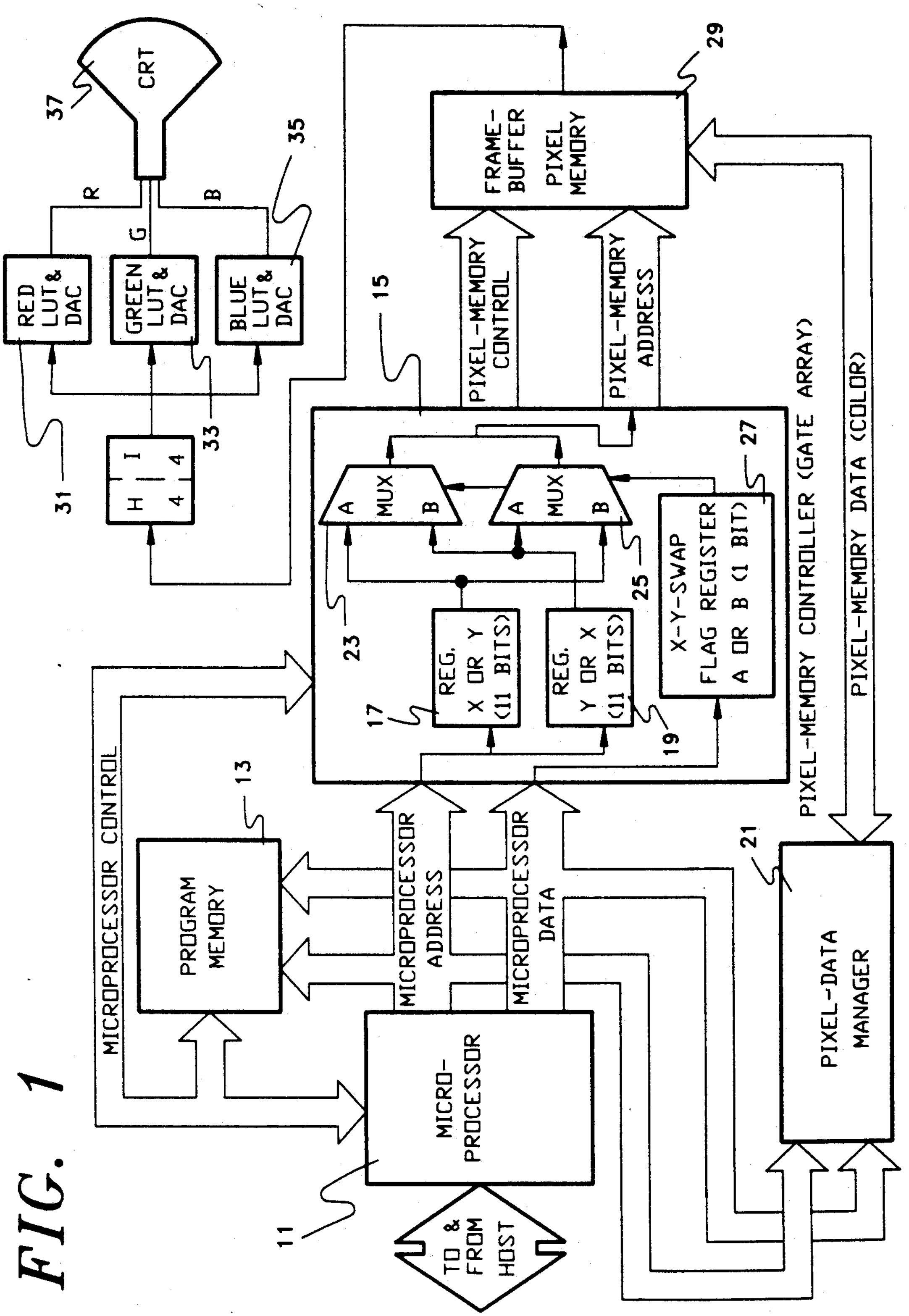
FIG. 1 is a block diagram of the entire line-drawing apparatus in accordance with this invention.

FIG. 1 of the drawings shows a microprocessor 11 which, among other functions, computes the "address" of each principal pixel and complementary pixel of each of the pixel pairs to be plotted in drawing the desired line. The respective addresses of each principal pixel and complementary pixel of each pixel pair are computed within a single iterative loop of the algorithm which controls the operation of the microprocessor in accordance with this invention. In order to make optimum use of the available space and time for computation, the numbers used in arriving at the respective addresses are expressed in floating-point format. To be able to process floating-point numbers internally, microprocessor 11 should be of a type such as the Texas Instruments Model TMS 32OC30, which possesses improved capabilities over its predecessors for the processing of numbers in floating-point format. The instructions for computation of the pixel addresses by microprocessor 11 are stored in a program memory 13, which is coupled to microprocessor 11. Program memory 13 may be, but need not *necessarily* be, of the static-random-access-memory type ("SRAM").

The principal pixel and the complementary pixel plotted during a single iteration of the computation loop within microprocessor 11 will hereinafter be referred to as a "pixel pair." After microprocessor 11 computes the respective addresses of each pixel pair in accordance with the instructions from program memory 13, the addresses of each pixel pair, together with data on the color intensity of the respective pixels of each pair, are successively forwarded by microprocessor 11 to a pixel-memory controller 15. The first eleven bits of pixel address computed by microprocessor 11 go to an (X or Y) address register 17, while the second eleven bits of pixel address computed by microprocessor 11 go to a (Y or X) address register 19. Both register 17 and register 19 are important components of pixel-memory controller 15.

As aforementioned, microprocessor 11 computes and stores in (X or Y) address register 17 and (Y or X) address register 19 of pixel-memory controller 15 the successive addresses for the principal pixel and complementary pixel of each pixel pair as the plotting of the line progresses. Those addresses are computed by incrementing (decrementing) and augmenting the respective-coordinates of the pixel pair just, or most recently, plotted in order to obtain the coordinates of the pixel pair next to be plotted in the development of the line. For reasons of economy in processing speed, the address computation is performed in floating-point format.

In contrast to the computation of the pixel *address* data in floating-point format, as just described in the preceding paragraph, the computation of the pixel *color* data is performed by the microprocessor using numbers in *integer* format. Moreover, the computation of the color-intensity data uses numbers to which has been applied a scale factor that should be a power of two, e.g. 16. The computation of the pixel- color-intensity data is accomplished in the same step as the computation of the pixel-address data. The algorithm that we prefer to employ in the practice of our invention is set forth in FIG. 2 of the drawings. At the top of FIG. 2 are listed the various instructions to be carried out in the reiteration of the "line-rendering loop" of the algorithm. *Below* those instructions in FIG. 2 are set forth *definitions* of all the terms that are used in the instructions.

Since the line-rendering loop is iterated repetitively, it is optional whether one chooses to set forth the instruction for computation of pixel addresses at the beginning or at the end of the loop. We have chosen to set forth the instruction for address computation at the *end* of the loop, but might equally well have set it forth at the *beginning* of the loop. For easy reference, the instructions and definitions set forth in FIG. 2 of the drawing are also set forth below:

```
Algorithm:
For i=0 to N do;
  SIcoordinate=FIX(SFcoordinate);
  intensity=SIcoordinate AND 15;
  color1=color OR intensity;
  Icoordinate=SHR(SIcoordinate, 4);
  Draw-pixel(Icoordinate, color1);
  color2=color1 XOR 15;
  Draw-pixel(Icoordinate+1, color2);
  SFcoordinate=SFcoordinate+DelSFcoordinate;
  End;
  Wherein:
    SIcoordinate=Scaled-integer coordinate of the
      pixel to be plotted and rendered;
    SFcoordinate=SIcoordinate in floating-point for-
      mat;
    DelSFcoordinate is floating-point scaled delta
      value needed to compute the address of the next
      pixel;
    Draw_pixel draws a pixel at the specified coordi-
      nate using the specified color;
    FIX converts a floating-point value to integer for-
      mat, truncating the fraction;
    AND is bitwise Boolean AND operation;
    OR is bitwise Boolean OR operation;
    XOR is bitwise exclusive OR operation; and
    SHR shifts bits right in a given word by a given
      number.
    Shifting bits by four places has the effect of division
      by 16.
    Scale factor used in this implementation is 16 to get
      4 bits of intensity.
```

As aforementioned, the instructions set forth above are stored in program memory 13. They may assume a pixel-memory-address space having dimensions of SCREEN_X and SCREEN_Y in the X and Y directions respectively. Once again, both the SCREEN_X and SCREEN_Y dimensions should be *powers of two.*

Thus, the pixel-address memory stored in program memory 13 constitutes a t having SCREEN_Y rows and SCREEN_X columns. Each pixel of the array can be addressed in a manner defined by the following relationship: SIcoordinate=SX coordinate+-SCREEN_X*SY coordinate. It will be understood that the "*" symbol indicates the operation of multiplication.

It is noteworthy that the first instruction in the algorithm of FIG. 2 uses the term "SIcoordinate," which stands for "scaled-integer coordinate of the pixel to be plotted and rendered." Accordingly, prior to the iteration of the line-rendering loop of FIG. 2, it is necessary for microprocessor 11 to apply the scale factor to convert floating-point coordinate into scaled-floating-point coordinate. Once again, the scale factor should be an even power of two, such as 16.

As has been noted earlier in this specification, the conventional line-drawing technique of the prior art involves the plotting on the display device of a series of single pixels that are located as near to the desired path of the line as is permitted by the discrete nature of the data available for plotting the line. For instance, the prior-art technique for drawing lines on a display is illustrated in FIG. 5 of the drawings. That figure represents an attempt, carried out in accordance with prior-art technique, to draw a straight line from the point (2,2) to the point (7,5), those points being represented in Cartesian coordinates. Ideally, the *second* point on the line should be plotted at (3.2.6), but the conventional technique *does not permit* a pixel to be centered at a point addressed by using fractional or partial distances between intersections of the lines of the matrix of the display. Accordingly, the second point on the line in FIG. 5 is plotted at (3.3) because that point is nearer to the line than is the point (3,2). It will be understood that each pixel plotted is centered at the *intersection* of one of the pairs of orthogonal lines that constitute the matrix of the display. Each point so plotted is indicated by an arrowhead in FIG. 5. The placement of the remaining points that would be plotted in accordance with the prior art is indicated in FIG. 5.

In accordance with *our invention*, on the other hand, a *pair of pixels* is plotted in place of every *single* pixel that would have been plotted in the prior art. It has been pointed out that the pixels of each pair are denoted "the principal pixel" and "the complementary pixel" respectively. In accordance with our invention, the second point to be plotted on the line would not be represented by a single pixel at (3,3) but would be represented by a principal pixel at (3,2) and a complementary pixel at (3,3). However, the total intensity of the color that is to characterize the displayed line is "allocated" between the principal pixel and the complementary pixel. The allocation of intensity is based upon the relative distances of the principal pixel and the complementary pixel from the desired path of the line. In the example of the second point to be plotted on the line, *two-fifths* of the intensity would be allocated to the pixel at (3,2), while *three-fifths* of the intensity would be allocated to the pixel at (3,3). Thus, the allocation of intensity between principal and complementary pixels is calculated at each pixel address on a "per-pixel" basis. In order that the plotting of a *pixel pair*, in place of each single pixel of the prior art, may not unduly delay the plotting of the pixels for the line, the allocation of intensity between the principal pixel and the complementary pixel of each pixel pair must be performed as rapidly as possible.

In plotting the line represented in FIG. 5, the absolute magnitude of the slope of the line is *less* than unity. Specifically, in that illustration, the slope is 0.6. We have found that the integrity of pixel data can best be maintained if the Cartesian coordinate which is increasing *more* rapidly during the plotting of the line is represented in the "high-order bits" of a floating point number, and the coordinate which is increasing *less* rapidly is represented in the "low-order bits" of the same floating-point number. Thus, in drawing the line of FIG. 5, the X coordinate would be incremented by unity, while the Y coordinate would be augmented by a fractional amount in going from one pixel to the next in plotting the line. If the absolute magnitude of the slope of the line being plotted were *greater* than unity, the Y coordinate would be incremented by unity, whereas the X coordinate would be augmented each time by a fractional amount in plotting successive pixels for the line. In either case, the coordinate involving a fractional amount appears in the "low-order bits" of the pixel address when expressed in floating-point format. Differently stated, the Cartesian coordinate aligned with the minor axis of the plot is always represented in the *low-order bits* of the floating-point number that specifies the pixel address expressed in floating-point format. The computation of the addresses of successive pixels in this way is advantageous in the application of the anti-aliasing technique of our invention because it saves time of computation and maximizes the speed of plotting the pixels of the line.

The advantageous nature of the use of floating-point numbers in the calculation of successive pixel addresses is especially pronounced when employed in the computation of the respective addresses of the *pixel pairs* that are required in the practice of our invention. The address of the *principal* pixel becomes simply the address, in floating-point format, from which the *fractional* component has been *removed*. That is to say, the address of the principal pixel is the *truncated* value of the X,Y address in floating-point format. Moreover, the address of the *complementary* pixel in each case is obtained simply by adding unity to the address of the *principal* pixel, such addition taking place in the direction of the minor axis of the matrix.

It is necessary to multiply by a *scale factor* the combined X and Y integer and fractional components of each pixel address and the combined delta quantities to be added to the aforementioned X, Y, and fractional components in computing the address of the next pixel to be plotted.

The choice of the aforementioned scale factor is important in optimizing the resolution and the anti-aliasing performance of the apparatus in accordance with our invention. The scale factor is determined by the number of possible intensity levels to be allocated to the principal and complementary pixels. The scale factor must be large enough to permit a reasonably accurate allocation of relative intensities between the principal and complementary pixels at each point to be plotted. On the other hand, as will be explained hereinafter, the number of bits of data that would be required to express the maximum allocable intensity levels should not be so great as to detract unduly from the memory space required for proper specification of the pixel *addresses*. The scale factor should be a power of two. Although this factor could be 8, or 32, we prefer to employ a scale factor of $2^4$ or 16. Of course, such a scale factor is representable by *four* bits of data.

If a scale factor of 16 is selected, the plotting of a line from (2,2) to (7,5) in accordance with our invention is illustrated in FIG. 6 of the drawings. The total of the intensity levels for each of the principal pixel and the complementary pixel of each pixel pair is 16. Thus, intensity levels are shown in FIG. 6 from 0 to 15, where 0 represents the *maximum* available intensity level. As between the principal pixel and the complementary pixel, the higher the number representing the intensity allocation, the *lower* is the intensity allocated to the indicated pixel of the pair. Thus, the second point on the line, which was approximated by a single pixel at (3,3) in FIG. 5 of the prior art, is now represented by a principal *pixel* at (3,2) and a *complementary* pixel at (3,3). The principal pixel is allocated an intensity level of 9 on the scale, whereas the complementary pixel is allocated the *higher* intensity level of 6 on the scale.

Once again, in order for the line-plotting instructions of FIG. 2 to be followed, the aforementioned scale factor must have been chosen, and microprocessor 11 must have applied it to the X coordinate in integer format, the Y coordinate in integer format, and the *fractional portion of the Y coordinate* in the event that the absolute magnitude of the slope of the line to be plotted is less than unity. Under the same circumstances, microprocessor 11 must also have computed appropriate delta scaled values for the X coordinate, the Y coordinate, and the fractional portion of the Y coordinate in order to increment the X coordinate and augment the Y coordinate to compute the address for the next pixel to be plotted.

The addition of the delta scaled values to the coordinates of the address of the just-plotted pixel is accomplished in *floating-point format* as indicated in FIG. 3 of the drawings. If the absolute magnitude of the slope of the line to be drawn is *greater* than unity, microprocessor 11 must supply the scaled Y coordinate, the scaled X coordinate (integer) and the scaled fractional portion of the X coordinate to be added to the respective appropriate delta scaled values for those three quantities as indicated in FIG. 4 of the drawings. This operation can be considered either in the nature of "initialization" before commencement of the iterative loop or alternatively as the *last* instruction of the operative portion of the algorithm illustrated in FIG. 2 of the drawings. In view of the repetitive nature of the computation of pixel address in going from a just-plotted pixel to the next pixel to be plotted, it may be more appropriate to position the aforementioned computation as the *last* instruction of the algorithm. Although the computation of pixel address is carried out in *floating-point* format, it is noteworthy that the other computations of the iterative loop are carried out in *integer* format.

Figure 7:
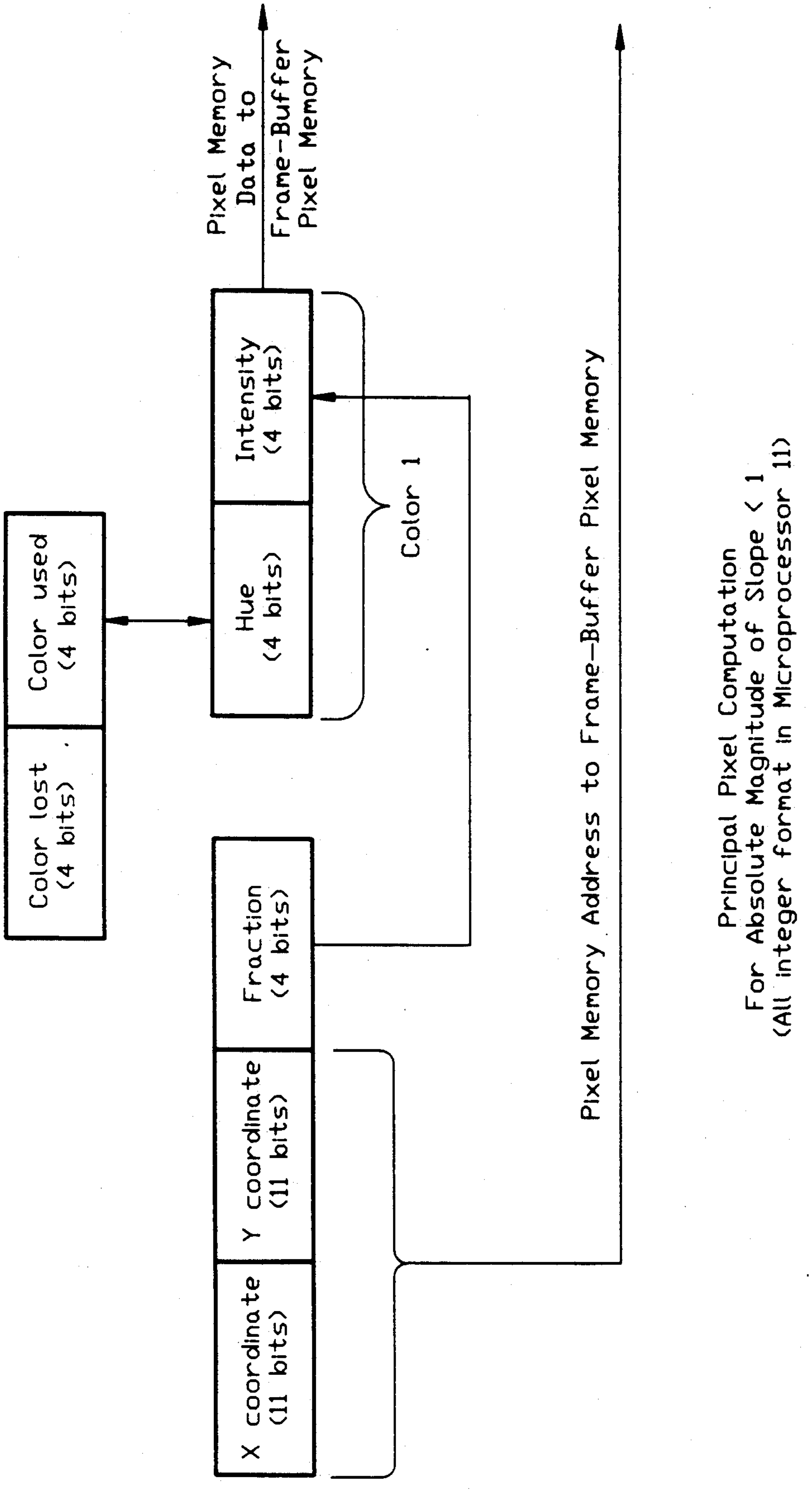
FIG. 7 is a schematic representation of the computation of address and color-intensity data for *principal* pixels in a line having an absolute slope less than unity.

The manner in which the *non-address* computations are carried out in *integer* format will now be explained. Turning to FIG. 7 of the drawings, we find a schematic representation of the way pixel-address data and color-intensity data are computed in microprocessor 11 for delivery to and storage in pixel-memory controller 15 and a pixel-data manager 21 respectively. The scaled X,Y address of the principal pixel to be plotted is represented schematically in integer format in FIG. 7. Once again, it is assumed that the scale factor is 16. The capacity of the aforementioned Texas Instruments microprocessor is such that 11 bits of integer can be assigned to the X coordinate and 11 bits of integer can be assigned to the Y coordinate, while four bits can be assigned to the fractional component of the desired Y coordinate of the address of the principal pixel. Remembering that the X coordinate is to be incremented by unity whereas the Y coordinate is to be augmented by a *fractional*, amount if the absolute magnitude of the slope of the line is less than unity, it becomes apparent that the four bits of fraction are representative of the distance by which the principal pixel is displaced from the desired -line, as a fraction of the total distance between the principal pixel and the complementary pixel, measured in the direction of the minor axis on the display. Stated in another way, the relative intensity which should be allocated to the complementary pixel in a normalized form is equal to the difference between unity and the aforementioned four bits of fraction in the Y component of the address of the principal pixel. This is a very significant relationship.

The 11 bits of X coordinate of the principal pixel, as illustrated in FIG. 7 of the drawings, can be stored in (X or Y) address register 17 of pixel-memory controller 15, shown in block diagram in FIG. 1 of the drawings, Similarly, the 11 bits of Y coordinate of the principal pixel can be stored in (Y or X) address register 19 of pixel-memory controller 15. The four bits of fraction of the Y coordinate for the principal pixel, on the other hand, go to pixel-data manager 21 as a measure of the color intensity of the principal pixel on the scale of 16, or whatever other scale factor may have been selected. As shown in FIG. 7, only four bits of the eight available bits of color data are required. It is assumed that the hue of the line being plotted for display remains constant from its origin to its terminus.

The foregoing explanation has been confined to the plotting of address and color data for the *principal* pixel in a line having a slope of absolute magnitude less than unity. The plotting of the address and color data for a *complementary* pixel in a line of the same slope is illustrated schematically in FIG. 8 of the drawings. As has been explained, the address of the complementary pixel is obtained by incrementing the Y coordinate by unity, because Y is the "minor axis" when a line having an absolute magnitude of slope less than unity is being plotted. Furthermore, the color intensity for the complementary pixel is obtained simply by complementing the four bits of fractional Y coordinate data which were available in the representation of FIG. 7. It will be understood that complementing the four bits of fractional data requires a subtraction of those four bits of data from the scale factor of 16, represented in binary form. Thus, the plotting of the complementary pixel involves two simple operations. The first such operation is the incrementation of the Y coordinate of the address by unity, a step performed automatically by the microprocessor and not requiring additional processing time. The second operation is the forming of the complement of the fraction taken from the Y coordinate and which, when complemented, represents the scaled intensity of the complementary pixel as compared to the principal pixel.

FIGS. 9 and 10 of the drawings represent schematically the corresponding computation of pixel-address and color-intensity data when the absolute magnitude of the slope of the line to be drawn is greater than or equal to unity. When the magnitude of the slope of the line to be plotted is greater than unity, the relative positions of the X and Y coordinates are *interchanged*, in contrast to their relative significance in the situations of FIGS. 7 and 8. It is now the X coordinate, rather than the Y coordinate, which has appended to it the four bits of "fraction" that provide the basis for allocation of color intensity between the principal and complementary pixels. In the representation of FIG. 9, the 11 bits of Y-coordinate data would go to (X or Y) address register 17, whereas the 11 bits of X-coordinate data would go to (Y or X) address register 19. The four bits of "fraction" now appended to the X coordinate would still go to pixel-data manager 21 as intensity data.

Finally, in the schematic representation of FIG. 10, it is now the X coordinate which is incremented by unity in computing the address of the complementary pixel, based upon the address of the corresponding principal pixel. The four bits of "fraction" that are complemented in order to arrive at the intensity of the complementary pixel are now appended to the X coordinate, rather than to the Y coordinate as in FIG. 8 of the drawings.

The schematic representation of the computation of the addresses and color-intensity data for the respective principal and complementary pixels may be completed by observing that the address data stored in (X or Y) address register 17 and (Y or X) address register 19 and the color-intensity data stored in pixel-data manager 21 may all be forwarded to a frame-buffer pixel memory. The data in the frame-buffer pixel memory are then withdrawn and converted to analog signals for actuation of the electron guns of the color cathode-ray tube to enable the drawing of the desired line on the screen of the color cathode-ray tube without significant undesirable effects attributable to aliasing of the display. It will now be worthwhile to discuss in detail the instructions provided to microprocessor 11 by program memory 13 to carry out the steps that have been summarized in schematic form.

The *first* step of the instructions set forth in FIG. 2 of the drawings assumes the availability from microprocessor 11 of address data in scaled floating-point format. Thus, the first step of the instructions converts such data from scaled floating-point format to scaled integer format. If a line of slope less than unity is to be plotted and displayed, the conversion produces a number of which 11 bits represent the X coordinate of the principal pixel to be plotted, while the *next* 11 bits represent the Y coordinate of the principal pixel to be plotted. The *final four bits*, representing the fractional component of the Y-coordinate data, are converted by the *second* step of the instructions to represent the intensity of color of the principal pixel to be plotted.

Assuming a scale factor of 16, the *second* step of the instructions is accomplished by a "bitwise AND" operation between the scaled integer coordinate of the pixel to be plotted and the numeral 15. (We continue to assume that the numeral 0 represents the *high* end of the color-intensity scale and that the intensity *decreases* as the scaled numbers *increase*). As previously explained, this operation is accomplished by abstracting the lowermost four bits of scaled Y-coordinate data. Those four bits of data representing the intensity of the principal pixel to be plotted go to pixel-data manager 21 and thence to the frame-buffer pixel memory.

The *third* step of the instructions requires microprocessor 11 to compute "color1," represented by an eight-bit number of which only four bits are used. Those four bits are combined with four other bits representing *hue* to form one eight-bit number (one byte), which again is stored in the frame-buffer pixel memory. The operation required by the third step of the instructions is a "bitwise OR" operation, performed by microprocessor 11.

The *fourth* step of the instructions requires the shifting of the scaled integer coordinate for the principal pixel to the right by four digits. It produces the integer coordinate address for the principal pixel for which the *color intensity* was established by the *third* step of the instructions. The integer coordinate representing the address of the principal pixel to be plotted goes to (X or Y) address register 17 or (Y or X) address register 19 in pixel-memory controller 15.

The *fifth* instruction given by program memory 13 to microprocessor 11 requires that microprocessor 11 perform the "Draw-pixel" operation, relying upon "color1," computed in accordance with the *third* instruction, and "Icoordinate," computed in accordance with the *fourth* instruction. In this operation, the address of the principal pixel (in integer format) and its color intensity are caused to be registered in pixel-memory controller 15 and in pixel-data manager 21 respectively, to be thereupon forwarded for storage in the frame-buffer pixel memory. The ways in which the frame-buffer pixel memory provides these data for conversion to analog form for actuation of the electron guns of the color cathode-ray tube are yet to be explained in detail.

The *sixth* instruction given by program memory 13 to microprocessor 11 is the computation of "color2," the color intensity of the *complementary* pixel to be plotted. The computation of color2 involves taking the complement of the intensity of "color1," the intensity of the principal pixel. The computation of color2 employs Boolean algebra to determine the complement of color1 with the total available intensity 15 on a scale of zero to 15, zero being the highest and 15 being the lowest intensity. The complementing function is performed by the "Exclusive OR" operation on a bitwise basis. The bitwise Exclusive OR operation can be visualized by considering an example. If the color intensity for the principal pixel (color1) were 10 on the scale of 0 to 15, that number in decimal form would be the equivalent of 1010 in *binary* form. The decimal number 15 (representing the upper end of the scale,) is 1111 in binary form. Execution of the "Exclusive OR" operation in bitwise Boolean algebra produces a complement of 0101 in binary form. Of course, that binary number is the equivalent of the number "5" in decimal form.

Figure 8:
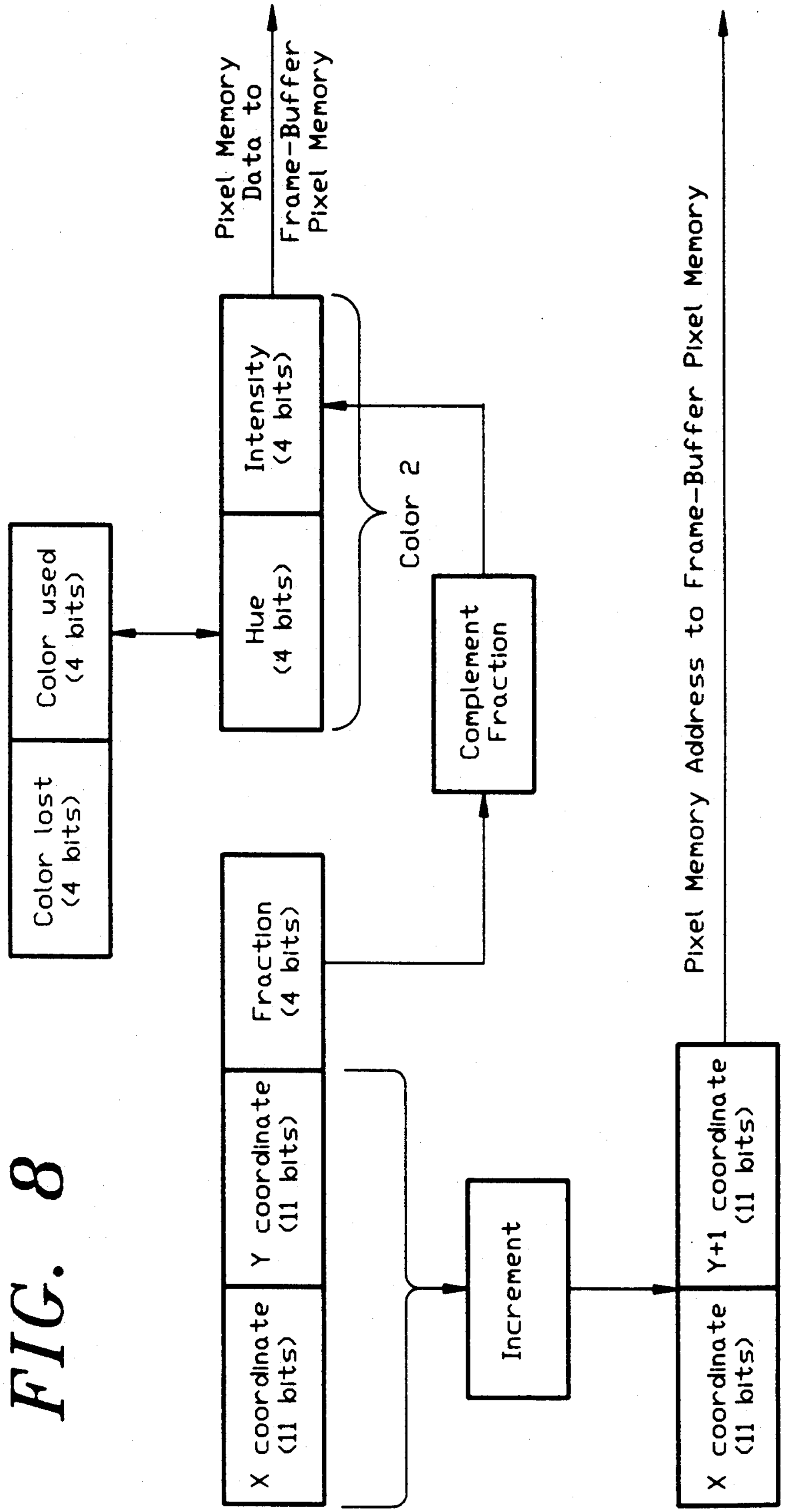
FIG. 8 is a schematic representation of the computation of address and color-intensity data for *complemen-*

As indicated in the discussion of FIGS. 8 and 10 of the drawings, the address of the complementary pixel is computed by incrementing by unity the Y coordinate or the X coordinate of the address of the *principal* pixel. The choice of which coordinate is incremented by unity, once again, depends upon the absolute magnitude of the slope of the line to be plotted and drawn. Thus, the address of the complementary pixel becomes either (X, Y+1) or (Y, X+1), depending upon the magnitude of the slope of the line. Each of these quantities is expressed in eleven bits of data. Having determined "Icoordinate+1" (the address) and color2 (hue and intensity), the operation "Draw—pixel" causes the address and the color intensity of the complementary pixel to be stored in pixel-memory controller 15 and in pixel-data manager 21 respectively. This is the *seventh* step to be executed pursuant to the instructions from program memory 13.

When the magnitude of the slope of the line to be plotted and drawn is *less* than unity, the address of the principal pixel is just *below* the desired path of the line, whereas the address of the complementary pixel is just

*above* the desired path of the line, and separated from the principal pixel by one unit of the scale, measured along the "minor axis" of the display, which in this case is the Y axis. When the magnitude of the slope of the line to be plotted and drawn is *greater than* or equal to unity, the address of the principal pixel is just to the *left* of the desired path of the line, whereas the address of the complementary pixel is just to the *right* of the desired path of the line, and separated from the principal pixel by one unit of the scale, measured along the minor axis of the display, which in this case is the X axis.

Having completed the plotting and storage of the respective addresses and color intensities of the principal and complementary pixels of the pixel pair under consideration, the subsequent procedure is the preparation of address data in floating-point format for the computation of the coordinates of the principal and complementary pixels of the pixel pair *next* to be plotted. This procedure is carried out in accordance with the *eighth* step in the instructions given to microprocessor 11 by program memory 13. The computation of the scaled address, in floating-point format, of the first principal pixel may be considered to be a *preliminary* step taken before the execution of the instructions of the "loop." Similarly, the computation of the scaled *delta values* required in going from the addresses of the pixel pair just plotted to the respective addresses of the pixel pair *next* to be plotted may likewise be considered to be a *preliminary* step carried out by microprocessor 11 *before* initiation of the instructions of the loop. However, the addition of the scaled coordinate of each pixel just plotted, in floating-point format, and the scaled delta value to be added to each scaled coordinate, once again in floating-point format, constitutes the *final step* in carrying out the instructions given to microprocessor 11 during each iteration of the loop. This step is illustrated schematically in FIGS. 3 and 4 of the drawings. The resulting sum is the address of the principal pixel *next* to be plotted.

The choice of floating-point format for the execution of the final step of the loop is a matter of considerable significance. The capacity of available microprocessors is not sufficient to accommodate both coordinates and a fractional portion of one of the coordinates, all expressed in *integer* format. On the other hand, the economy of use of available capacity in the microprocessor permits those quantities, and the corresponding delta values for each of them, to be expressed in *floating-point* format. Hence, we have chosen to compute the *addresses* of the principal pixel and the complementary pixel of each pixel pair in floating-point format. However, the capacity of the microprocessor allows us to carry out the *other* steps of the "loop" in *integer* format. Thus, all the computation of color-intensity data is carried out in integer format.

The Texas Instruments microprocessor Model TMS 32OC30, which we prefer to employ as microprocessor 11, has a 32-bit data capability and a 24-bit address capability. Of the 24 bits of address capability, 11 bits are required for each of the X and Y addresses, making a total of 22 bits necessary for address purposes. The remaining two bits of the 24-bit address capability are required by the frame-buffer pixel memory for control purposes of decoding pixel-memory addresses. The two bits of data used for control purposes are indicated by the "Pixel Memory Control" arrow that runs from pixel-memory controller 15 to the frame-buffer pixel memory 29 in FIG. 1 of the drawings. Even the superior pixel-address capability of the aforementioned Texas Instruments microprocessor is not sufficient to allow the entry of integer numbers for X and Y coordinates and also for delta values of *both* coordinates. Entry of integer-format coordinates for X and Y and integer-format delta values for both X and Y would cause an *overflow* of the available 32-bit data capability. The adoption of *floating-point* format for the computation of pixel addresses overcomes this limit on data capability because each address can be expressed in terms of its X and Y integer coordinates and the fractional or delta value of only one of them. In computing color intensity and in carrying out the instructions other than for computation of pixel address, the limited capability of the microprocessor does not cause a problem. Therefore, those operations can be carried out in *integer* format.

Having explained the execution of the instructions included within the "iterative loop" stored in program memory 13, we shall now explain the ways in which the results of executing those instructions are employed in the apparatus our invention.

We have already observed that pixel-address data computed in accordance with instructions from program memory 13 are stored in (X or Y) address register 17 and (Y or X) address register 19, both of which may be integral parts of pixel-memory controller 15. Pixel-memory controller 15 is primarily a gate array of a type obtainable on a single "chip" from XILINX, Inc. of San Jose, Calif. under Model No. XC3030. (X or Y) address register 17 is an 11-bit register in which X- or Y-coordinate data may be stored, depending upon the absolute magnitude of the slope (relative to unity) of the line to be plotted and drawn. (Y or X) address register 19 is also an 11-bit register, in which Y- or X- coordinate data may be stored, again depending upon the slope of the line relative to unity.

The outputs of (X or Y) address register 17 and (Y or X) address register 19 go to a first multiplexer 23 and a second multiplexer 25, both of which may be accommodated on the "chip" of pixel-memory controller 15. The cooperation of first multiplexer 23 with second multiplexer 25 depends upon the absolute magnitude of the slope of the line to be plotted and displayed. Once again, if the absolute magnitude of the slope is *less than* unity, the pixel addresses are computed by incrementing the X coordinate by unity and by augmenting the Y coordinate by an appropriate fractional amount less than unity. On the other hand, if the absolute magnitude of the slope of the line is equal to or *greater than* unity, the appropriate procedure is to increment the Y coordinate by unity and to augment the X coordinate by a fractional amount less than unity. When changes of line slope across the unity "border" take place, the cooperation of first multiplexer 23 and second multiplexer 25 must change accordingly. Therefore, pixel-memory controller 15 also includes an X-Y-swap flag register 27. This is a one-bit register that indicates whether the absolute magnitude of the slope of the line to be drawn is greater than or less than unity.

The outputs of first multiplexer 23 and second multiplexer 25, in the form of discrete integer numbers, go to frame-buffer pixel memory 29 for assembly into bit planes in a manner that has been explained in the introductory paragraphs of this specification. The data in frame-buffer pixel memory 29 are accessed, one pixel at a time, and are fed to look-up tables 31, 33, and 35 for the three primary colors red, green, and blue respectively. The pixel data derived by look-up tables 31 through 35 from frame-buffer pixel memory 29 take the form of "bytes" comprising four bits of color-hue data and four bits of color-intensity data.

Frame-buffer pixel memory 29 may comprise a number of memory chips which together aggregate the required memory capacity. The amount and type of memory capacity may be chosen to fulfill the requirements of individual users.

Each of the three look-up tables 31, 33, and 35 should be connected to a digital-to-analog converter for processing data representing the intensity of one of the three primary colors, red, green, or blue for the line to be drawn. The respective digital-to-analog converters may be formed integrally with the look-up tables that supply digital data to them. The respective outputs of the three digital-to-analog converters, in turn, go to the three electron guns of a color cathode-ray tube 37 on which the line is to be drawn and displayed.

In implementing the three look-up tables 31, 33, and 35 and their respective digital-to-analog converters, we prefer to employ an integrated circuit Model BT-474, marketed by Brooktree Corporation of San Diego, Calif. This Brooktree product includes color-lookup tables and digital-to-analog converters for all three primary colors, integrated on a single "chip."

FIG. 11 of the drawings illustrates *conceptually* the color-lookup and conversion functions performed by look-up tables 31, 33, and 35 and by the respective digital-to-analog converters that accompany them. FIG. 11 shows an imaginary single matrix that furnishes an appropriate driving voltage to each of the respective electron guns of the color cathode-ray tube for every possible combination of hue and intensity signals inputted to the matrix. For each possible combination of hue index and intensity index, there are three output signals for driving the respective electron guns. In actuality, it is much more practical to employ three *distinct* look-up tables, one for each of the primary colors, and to combine them with respective *distinct* digital-to-analog converters in a single integrated circuit such as the Brooktree Model BT-474, or its equivalent.

It has been explained that the color intensity data are provided to frame-buffer pixel memory 29 by pixel-data manager 21, which is a gate array connected to the address and data busses from microprocessor 11 as well as the pixel-memory data bus to frame-buffer pixel memory 29. The gate array which we prefer to employ in pixel-data manager 21 is Model XC3030, marketed by XILINX, Inc. of San Jose, Calif. This is a single-chip device that is adapted to receive address and control signals from microprocessor 11. It also exchanges pixel-memory data relating to color intensity with frame-buffer pixel mem The method and apparatus of our invention can be employed substantially to eliminate the objectionable effects of aliasing in the plotting of pixels that together comprise a line to be displayed in a computer-generated output. The method involves the plotting of a pixel pair comprising a principal and a complementary pixel in place of each single pixel that would have been plotted in the practice of the methods of the prior art, based upon the well-known algorithm of J.E. Bresenham. As has been explained, the intensities allocated to the principal and complementary pixels of each pixel pair are functions of their respective distances, measured along a minor axis of the display screen, from the desired path of the line to be plotted and displayed. More particularly, the relative intensities of the principal and the complementary pixels vary as *inverse* functions of their respective distances from the desired path of the line to be plotted and displayed. Although each pixel occupies a relatively small portion of the area of the display screen, the psychological functioning of the human eye and brain permits a *pair* of pixels straddling the desired path of the line to be interpreted as if they constituted a *single* pixel located *on the desired path of the line*. The intensities of the respective ones of the pixel pair must be "weighted" as inverse functions of their distances from the desired path of the line to be plotted.

The anti-aliasing method and apparatus that are primary topics of this specification represent an extension of a concurrent development that enables the speed of pixel plotting in line-drawing apparatus to be substantially increased when the incrementation and augmentation of the addresses of those pixels are carried out in floating-point format. For the dual purposes of substantially increasing the speed of pixel-address and intensity computation and of substantially eliminating the effects of aliasing in the plotting of pixels that comprise the line to be drawn, the employment of state-of-the-art components such as the aforementioned microprocessor marketed by Texas Instruments Inc. is highly desirable.

The most useful known embodiment of the method and apparatus in accordance with our invention has been fully described in the foregoing specification. However, variations thereof will undoubtedly occur to readers of the specification. Accordingly, the following claims define the scope of the invention which, with its equivalents, is covered hereby.

What we claim as new and desire to secure by Letters Patent of the United States is as follows:

1. Apparatus for plotting a series of pixels approximating a desired straight line on a display device, said line being characterized by a predetermined magnitude of slope, and each of said pixels being characterized by a predetermined hue and intensity, said apparatus comprising:

(a) a microprocessor, (b) program-memory means for controlling said microprocessor to cause it to generate address and intensity data for said series of pixels, said intensity data being in integer form and said address data being in both integer and floating-point forms, and for supplying hue data for said series of pixels, (c) pixel-memory control means for receiving said address data from said microprocessor and for processing said address data as a function of said predetermined magnitude of slope of said desired straight line, said pixel-memory control means including first and second address registers and first and second multiplexers, said first and second address registers being connected to said microprocessor to receive address data therefrom, and being cross-coupled to feed data from both registers to said first and second multiplexers, (d) pixel-data-manager means for receiving said address data and said intensity data from said microprocessor, and (e) frame-buffer pixel-memory means for receiving said processed address data from said pixel-memory control means and said intensity data from said pixel-data-manager means.

2. Apparatus in accordance with claim 1 in which the capacity of each of said address registers is eleven bits of data.

3. Apparatus in accordance with claim 1 in which said pixel-memory control means further includes a flag register for indicating whether the predetermined magnitude of slope of said line is greater or lesser than unity.

4. Apparatus in accordance with claim 3 in which the capacity of said flag register is one bit of data.

* * * * *